W. A. Clark,
Wood Auger.

Nº 21,597.   Patented Sep. 28, 1858.

UNITED STATES PATENT OFFICE.

W. A. CLARK, OF BETHANY, CONNECTICUT.

EXPANSIVE BIT.

Specification of Letters Patent No. 21,597, dated September 28, 1858.

*To all whom it may concern:*

Be it known that I, WILLIAM A. CLARK, of Bethany, in the county of New Haven and State of Connecticut, have invented certain new and useful Improvements in Expansive Bits, the construction and operation of which I have described in the following specification and illustrated in the accompanying drawings with sufficient clearness to enable competent and skilful workmen in the arts to which it pertains or is most nearly allied to make and use my invention.

My said invention consists in first, the combination of a plate or follower beveled in the manner described with a V shaped or equivalent groove in the shank of the bit, and with a movable cutter also beveled upon the upper edge, as described, for the purpose of securing said movable cutter firmly in its place as hereinafter set forth, the plate or follower being drawn home by means of a screw or its equivalent. Second, so arranging the movable and stationary cutters in relation to each other, and to the other parts that all the chips made by the instrument shall be delivered upon one and the same side of the shank of the bit, thereby allowing the other side of said shank to be left entire to support the working parts, any recess on the back side of the shank to allow the chips to pass being by this device rendered unnecessary.

Figure 1:
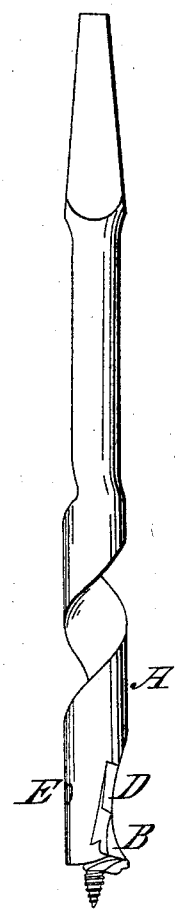
Figure 2:
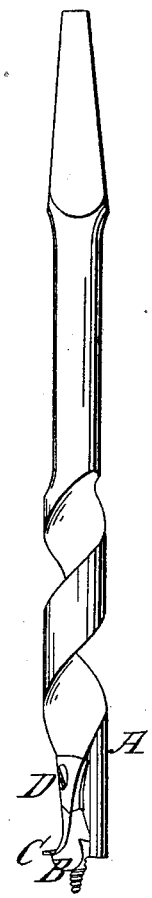
Figure 3:
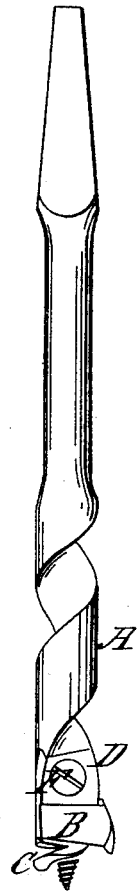

In the accompanying drawings, Figure 1— is an elevation of my improved bit. Fig. 2— is also an elevation showing the side opposite to that shown in Fig. 1. Fig 3— is also an elevation, its plane of projection, being transverse to Figs. 1 and 2.

A, is the shank or body of the bit, upon upon which the inner or stationary cutter is formed, and in which a recess is made, which receives the movable cutter B. The construction of the ledge upon which the lower edge of this movable cutter rests, and also the construction of the cutter B, itself, are very fully and clearly described in the patent granted to me, the 11th day of May 1858, for "Method of seating the movable cutter in expansive bits," to which I refer for so much of the description therein contained, as is not indispensable in this connection. To secure this cutter firmly in position, I provide a plate, D, so beveled at its lower edge, as to fit the upper edge of said cutter, and so beveled at its upper edge as to fit into a V shaped groove in the shank of the implement, as shown, in such a manner as to keep it in place, and also to secure its perfect bearing upon the seat, back of it, and consequently obtain a more parallel bearing of this plate upon the cutter B, when it is set out to cut its maximum hole.

I am aware that the cutters of planing machines, have been secured in the cutter head by means of a follower, in some respects resembling mine, but the angle of the back upper corner of that plate is obtuse, so as to make the follower wedge shaped, the seat upon the cutter head to receive it, being made to correspond with it, so that screwing down this plate amounts to the same thing as driving a blunt wedge, in the same place by means of a screw, and no more; consequently the follower may or may not rest upon the seat back of it, according as the width of the cutter below it, the position of said cutter in the stock, or other contingent circumstances may favor or oppose such a position, and if the cutter B is moved out to cut its maximum hole that end of the follower which is not kept up by the heel of the cutter, will be drawn home upon the seat while the other end, which should fit snugly upon the cutter and hold it in place, will be raised up so that the follower will only bear upon the extreme end of the cutter, thereby leaving the cutter only partially supported. My fastening is not liable to this difficulty, its form, and that of the shoulder against which it fits, at its upper edge, being such as to insure the perfect bearing of the whole length of its upper edge against the seat back of it as it is driven home by the screw E. The form of this shoulder is not only not such as to prevent the follower from coming home, but it is such as to effectually prevent its rising out of place, as will be seen by an inspection of the drawings.

It is important that the screw should have considerable depth of metal, to support it where it is screwed into the shank, and while sufficient strength must be retained, it is yet very advantageous to set the cutter B, back far enough to bring the cutting edge as nearly back to the center of the stock, as circumstances will admit. If then one of the cutters delivers its chips upon the back side of the stock, as has formerly been the case, it is plain that either the cutter B, must be set too far forward in the stock or shank, or else this stock or shank must be very much weakened if not entirely cut in two, by the recess in front and the groove in the back of both, and if the chips are delivered upon two sides of the shank, room must necessarily be left to receive them. I obviate this difficulty in my bit, by so constructing and arranging the cutters in relation to each other that all the chips shall be delivered upon one and the same side of the shank which enables me to leave the back side of the shank entire, and thus secure additional strength and at the same time, arrange some of the parts in positions where they will operate more efficiently. To accomplish this purpose the cutter or lip C, is formed in that position upon the shank in which it is represented in the drawings, or in other words, in such a position that it will deliver its chips upon that side of the shank which is cut away to receive the cutter B and upon which the cutter B delivers its chips, thus delivering all the chips upon one side and allowing the other side to be left entire to give the necessary strength.

In wood boring tools which are required to bore to any considerable depth, a spiral pod to carry up the chips is desirable. In expansive bits, it has been found difficult to secure such an arrangement of parts as to allow the spiral or screw form to be given to the groove sufficiently far down to render the necessary service at the point where it is perhaps most needed. For the purpose of bringing this lead or spirality of the chip conveying pod down nearly to the cutters, I make the follower D, winding, as shown in Figs. 2 and 3; and also make the seat back of it winding, or spiral to correspond, which not only gives the wind required for the pod at that point, but also gives greater thickness and consequent strength to the shank at the point where the screw E, is inserted to drive home the follower.

Having thus fully described my invention I wish it distinctly understood that I do not claim a wedge, or a wedge and screw combined, as a means of securing a movable cutter. Neither do I claim a bit with two movable cutters in front of one of which the stationary cutter delivers its chips. This is not new, and further, it does not accomplish the purpose for which my invention is designed, as the chips are not all delivered upon the same side of the instrument, and the back side thereby allowed to be left entire as in my invention.

The particular improvements which constitute my said invention and which I claim as having been originally and first invented by me are—

1. The combination of the follower D, beveled upon its under side in such a manner that driving it home against the cutter shall crowd it upward, with a lip or shoulder above it upon the shank, which lip or shoulder is so formed that this upward pressure above mentioned shall crowd the upper edge of the follower in against the seat back of it, when the upper edge of the follower is beveled to correspond as set forth, for the purposes stated, the follower being brought home to its place by a screw or in any equivalent manner.

2. So arranging the movable and stationary cutters in relation to each other and to the other parts, that all the chips made by the instrument shall be delivered upon one and the same side of the shank of the bit, thereby allowing the back side of the shank of the bit to be left entire as set forth.

WM. A. CLARK.

Witnesses:
 JAS. H. GRIDLEY,
 CHAS. H. SHEPARD.